3,405,081
SOLUBILIZATION OF POLYACRYLONITRILES AND CELLULOSE IN LIQUID SULFUR DIOXIDE
Kunio Hata, 6–55 Araya-Hinai-cho; Kingo Yokota, 5–25 Araya-Hinai-cho; and Akira Hasegawa, 6–17 Araya-Hinai-cho, all of Akita-shi, Akita-ken, Japan
No Drawing. Continuation-in-part of application Ser. No. 451,337, Apr. 27, 1965. This application June 2, 1966, Ser. No. 554,675
Claims priority, application Japan, June 5, 1965, 40/33,233; June 16, 1965, 40/35,924; Aug. 31, 1965, 40/53,201; Jan. 31, 1966, 41/5,940
12 Claims. (Cl. 260—17.4)

ABSTRACT OF THE DISCLOSURE

A homogeneous polymer solution is prepared by dissolving in liquid sulfur dioxide an acrylonitrile polymer in the presence of a solubilizing agent which is soluble in liquid sulfur dioxide.

---

This invention relates to a process of preparing homogeneous polymer solutions from cellulosic materials and synthetic polymers and has particular reference to the use of liquid sulfur dioxide as a solvent for such materials.

This application is a continuation-in-part of the U.S. application Ser. No. 451,337, filed on Apr. 27, 1965, in which the inventors have reported the discovery that sulfur dioxide in its liquid state exhibits a unique ability to dissolve various synthetic polymers as well as cellulosic materials in the presence or absence of amines.

As a result of continued research activities, the inventors have found further improvements as herein discussed in greater detail.

The polymer solution herein referred to is known, among other uses, to be a valuable material for the production of various synthetic fibers by a solution spinning or emulsion spinning.

There have been proposed various methods of dissolving cellulosic materials for the manufacture of yarns, films, flakes and other commercial products. A typical example is to transform cellulose into an ether or ester derivative which is then dissolved in a suitable solvent. Another is to dissolve the material as complex salts.

Also, many different inorganic and organic solvents are known for dissolving synthetic high-polymer materials. However, these solvents in conventional practice are limited in their dissolving activity to some particular types of polymers, respectively, and are not always satisfactory in that they are incapable of dissolving mixtures of naturally occurring cellulose and synthetic polymers or mixtures of different polymers into homogeneous solutions.

Whereas, it is the primary object of this invention to provide novel, useful methods of preparing solutions of various polymers and/or mixtures thereof, which will eliminate the above-noted difficulties.

It is another object of the present invention to provide new methods of dissolving various polymers in liquid sulfur dioxide which exhibits outstanding effects as a solvent significantly different from any conventional types of solvent.

The primary importance of the instant invention lies in the discovery that sulfur dioxide in its liquid state has a unique ability to dissolve a large variety of polymers with or without certain additives.

The solubilization mechanism in which polymers are dissolved in liquid sulfur dioxide, is not precisely known at this time. The inventors, however, attribute the results most likely to the formation of certain adducts of sulfur dioxide and polymers owing to the dipolar action of the liquid sulfur dioxide.

The method of the invention for preparing homogeneous polymer solutions or emulsions comprises mixing one or more of the different polymers hereinafter defined with liquid sulfur dioxide, if necessary, in the presence of solubilizing agents such as amines, heterocyclic compounds, salts of amines, inorganic salts highly ionizable in sulfur dioxide, halogenoaliphatic acids and phenols. These solubilizing agents are all soluble in the liquid sulfur dioxide.

The inventors have found that polyvinyl acetates can be readily dissolved in liquid sulfur dioxide without the aid of any solubilizing agents.

Cellulose and polyvinyl alcohols are dissolvable in liquid sulfur dioxide in the presence of amines or heterocyclic compounds such as pyridine and lutidine. Said amines include aliphatic secondary and tertiary amines such as dimethyl amine, trimethyl amine, diethyl amines, triethyl amine and diisoamyl amine and alicyclic amine such as piperidine.

Solubilizing agents effective for dissolving polyamides and acrylonitrile copolymers in liquid sulfur dioxide are such inorganic salts which are highly ionizable and easily soluble in liquid sulfur dioxide such as potassium iodide and ammonium thiocyanate, and salts of amines such as trimethyl amine hydrochloride, triethylamine hydrochloride, $\beta$-chlorotriethylamine hydrochloride and tetramethylammonium chloride. Potassium iodide and ammonium thiocyanate are found also capable of dissolving polyacrylics in liquid sulfur dioxide.

It has been found that modacrylic polymers (acrylonitrile copolymers containing not more than about 85% of acrylonitrile) such as acrylonitrile-vinyl acetate, acrylonitrile-methacrylate and acrylonitrile-styrene copolymers may be substantially dissolved in liquid sulfur dioxide without the addition of any solubilizing agents or accelerators. However, these copolymers, if their acrylonitrile content exceeds about 85%, would require the use of potassium iodide, ammonium thiocyanate or some of the above-mentioned amine salts in order to be dissolved in liquid sulfur dioxide.

It has further been found that some phenols and some halogenoaliphatic acids are useful for promoting the solubilization, by liquid sulfur dioxide, of polyamides, polyethylene terephthalates, polyacrylics and acrylonitrile copolymers. These phenols include phenol, cresol, resorcinol, p-chlorophenol, p-ntrophenol and $\alpha$-naphthol, while the halogenoaliphatic acids just mentioned include monochloroacetic acid and trichloroacetic acid.

Difficulty has been experienced in melt-spinning polyacrylics and acrylonitrile copolymers due to their low resistance to heat, thus they are converted into fibers by the so-called solution spinning. This is also made possible by the use of liquid sulfur dioxide according to the invention.

It is another advantage of the invention that two or more different polymers may be jointly solubilized for solution spinning whereby there may be obtained, for example, fibers of the various physicochemical properties desired in the respective end-products.

Another advantage is that since the sulfur dioxide, which is normally gaseous, is used in a liquid phase according to the invention, it can be easily removed from the polymer solution as soon as the same is brought to room temperature or depressurized for the formation of fibers, films and the like.

Of course, it is possible to discharge the polymer solutions prepared according to the invention into water or organic solvents such as alcohols or acetone for the production of the desired commercial end-products.

The invention will now be illustrated by the following specific examples.

EXAMPLE 1

1,000 milliliters of liquid sulfur dioxide cooled below −10° C. was introduced into a reactor, followed by the addition of 50 grams of either polycaprolactam or polyhexamethyleneadipamide and 200 grams of triethylamine hydrochloride. The reactor was held air-tight and thereafter was shaken at room temperature for three hours whereby a colorless or dark brown solution was obtained.

Similar results were obtained with 700 grams of potassium iodide and 200 grams of resorcinol, respectively, in place of triethylamine hydrochloride.

EXAMPLE 2

1,000 milliliters of liquid sulfur dioxide cooled below −10° C. was introduced into a reactor, followed by the addition of 100 grams of polycaprolactam or polyhexamethyleneadipamide and 300 grams of monochloroacetic acid. The reactor was held air-tight, and thereafter was shaken at room temperature until a colorless or yellowish viscous solution was obtained.

In place of monochloroacetic acid, there were used respectively 200 grams of β-chlorotriethylamine hydrochloride, 300 grams of phenol and 400 grams of cresol whereby similar results were obtained.

EXAMPLE 3

1,000 milliliters of liquid sulfur dioxide cooled below −10° C. was introduced into a reactor, followed by the addition of 50 grams of polycaprolactam and 350 grams of p-chlorophenol. The reactor was held air-tight to maintain the sulfur dioxide in liquid state, and thereafter was shaken at room temperature to permit the polymer to be dissolved.

Similar results were obtained with 300 grams of p-nitrophenol in place of said p-chlorophenol.

EXAMPLE 4

1,000 milliliters of liquid sulfur dioxide cooled below −10° C. was introduced into a reactor, followed by the addition of 800 grams of ammonium thiocyanate and 100 grams of polyacrylonitrile ($\eta_{sp}=0.17$). The reactor was held air-tight to maintain the sulfur dioxide in liquid state and thereafter, was shaken at room temperature for three hours whereby a transparent, reddish yellow solution was obtained.

In place of said ammonium thiocyanate, there were used respectively 200 grams of trichloroacetic acid, 600 grams of potassium iodide, and 350 grams of p-chlorophenol whereby similar results were obtained, with the exception of processing at −25° C. in the case of p-chlorophenol.

"$\eta_{sp}$" represents the specific viscosity of the polymer dissolved in dimethylformamide (0.1 g./100 ml.).

EXAMPLE 5

1,000 milliliters of liquid sulfur dioxide cooled below −10° C. was introduced into a reactor, followed by the addition of 50 grams of acrylonitrile-vinyl acetate copolymer having an acrylonitrile content of 89.5% ($\eta_{sp}=0.17$) and 200 grams of β-chlorotriethylamine hydrochloride. The reactor was held air-tight to maintain the sulfur dioxide in liquid state, and thereafter was shaken at room temperature whereby a transparent colorless, or light brown viscous solution was obtained.

Similar results were obtained with 500 grams of triethylamine hydrochloride in place of said β-chlorotriethylamine hydrochloride.

EXAMPLE 6

1,000 milliliters of liquid sulfur dioxide cooled below −30° C. was introduced into a reactor, followed by the addition of 50 grams of acrylonitrile-vinyl acetate copolymer as used in Example 5 and 350 grams of phenol. The reactor was held air-tight to maintain the sulfur dioxide in liquid state, and thereafter was shaken at room temperature whereby a transparent viscous solution was obtained.

In place of said phenol, there were used respectively 600 grams of cresol, 300 grams of α-naphthol and 350 grams of p-chlorophenol whereby similar results were obtained.

EXAMPLE 7

1,000 milliliters of liquid sulfur dioxide cooled below −10° C. was introduced into a reactor, followed by the addition of 50 grams of either acrylonitrile-vinyl acetate copolymer having an acrylonitrile content of 62.3% ($\eta_{sp}=0.17$) or acrylonitrile-methyl methacrylate copolymer having an acrylonitrile content of 70% ($\eta_{sp}=0.15$). The reactor was held air-tight to maintain the sulfur dioxide in liquid state, and thereafter was shaken at room temperature whereby a colorless transparent solution was obtained.

EXAMPLE 8

1,000 milliliters of liquid sulfur dioxide cooled to −10° C. was introduced into a reactor, followed by the addition of 200 grams of acrylonitrile-methyl methacrylate copolymer having an acrylonitrile content of 92.5% ($\eta_{sp}=0.17$) and 300 grams of trichloroacetic acid. The reactor was held air-tight to maintain the sulfur dioxide in liquid state and thereafter, was shaken at room temperature whereby a transparent viscous solution was obtained.

In place of said trichloroacetic acid, there were used respectively 300 grams of α-naphthol, 350 grams of p-chlorophenol, 500 grams of triethylamine hydrochloride and 200 grams of tetramethylammonium chloride whereby similar results were obtained.

EXAMPLE 9

1,000 milliliters of liquid sulfur dioxide cooled below −20° C. was introduced into a reactor, followed by the addition of 150 grams of acrylonitrile-styrene copolymer having an acrylonitrile content of 57% ($\eta_{sp}=0.096$). The reactor was held air-tight to maintain the sulfur dioxide in liquid state, and thereafter shaken to give a viscous solution with slight emulsion.

EXAMPLE 10

1,000 milliliters of liquid sulfur dioxide cooled below −20° C. was introduced into a reactor, followed by the addition of 150 grams of acrylonitrile-styrene copolymers having acrylonitrile content of 88% and 500 grams of phenol. The reactor was held air-tight to maintain the sulfur dioxide in liquid state and thereafter, was shaked whereby a homogeneous solution was obtained.

Similar results were obtained with 500 grams of β-chlorotriethylamine hydrochloride and 800 grams of ammonium thiocyanate, respectively, in place of said phenol.

EXAMPLE 11

1,000 milliliters of liquid sulfur dioxide cooled below −10° C. was introduced into a reactor, followed by the addition of 40 grams of polyethylene terephthalate and 500 grams of trichloroacetic acid. The reactor was held air-tight to maintain the sulfur dioxide in liquid state, and thereafter was shaken at room temperature to permit the polymer to be dissolved until a transparent viscous solution was obtained.

In place of said trichloroacetic acid, there were used respectively 500 grams of phenol, 200 grams of resorcinol and 300 grams of p-chlorophenol whereby similar results were obtained.

EXAMPLE 12

1,000 milliliters of liquid sulfur dioxide cooled below −10° C. was introduced into a reactor, followed by the addition of 20 grams of chemical pulp and 80 grams of diethylamine. The reactor was held air-tight to maintain the sulfur dioxide in liquid state and thereafter was shaken for about one hour at room temperature to completely dissolve the cellulose. The reactor was cooled again, followed by the addition thereto of 20 grams of acrylonitrile-vinyl acetate and copolymer having an acrylonitrile contents of 89.5% ($\eta_{sp}$=0.17) and 200 grams of triethylamine hydrochloride and then was shaken at room temperature to give a solution containing acrylonitrile copolymer and cellulose.

Similar results were obtained with 120 grams of triethylamine and 140 grams of piperidine, respectively, in place of said diethylamine and/or with 100 grams of β-chlorotriethylamine hydrochloride in place of said triethylamine hydrochloride.

EXAMPLE 13

1,000 milliliters of liquid sulfur dioxide cooled —10° C. was introduced into a reactor, followed by the addition of 50 grams of polyacrylonitrile, 50 grams of polycaprolactam and 350 grams of p-chlorophenol. The reactor was held air-tight to maintain the sulfur dioxide in liquid state, and thereafter was shaken at room temperature whereby a viscous composite solution or emulsion was obtained.

Similar results were obtained with 50 grams of acrylonitrile-vinyl acetate copolymer, acrylonitrile-methyl methacrylate copolymer or acrylonitrile-styrene copolymer in place of said polyacrylonitrile, with 50 grams of hexamethyleneadipamide in place of said polycaprolactam and/or with 800 grams of ammonium thiocyanate or 700 grams of potassium iodide in place of said p-chlorophenol.

EXAMPLE 14

1,000 milliliters of liquid sulfur dioxide cooled below —10° C. was introduced into a reactor, followed by the addition of 50 grams of polycaprolactam and 250 grams of triethylamine. The reactor was held air-tight to maintain the sulfur dioxide in liquid state, and thereafter was shaken at room temperature to dissolve the polymer. The reactor was again cooled below —10° C. and 50 grams of acrylonitrile-vinyl acetate copolymer having acrylonitrile content of 89.5% were added thereto and the reactor was shaken at room temperature whereby a composite solution was obtained.

Similar results were obtained with 200 grams of β-chlorotriethylamine hydrochloride, 300 grams of phenol, respectively, in place of said triethylamine.

EXAMPLE 15

1,000 milliliters of liquid sulfur dioxide cooled below —10° C. was introduced into a reactor, followed by the addition of 40 grams of polyethylene terephthalate and 500 grams of trichloroacetic acid. The reactor was held air-tight to maintain the sulfur dioxide in liquid state, and thereafter was shaken at room temperature to permit the polymer to be dissolved. The reactor was again cooled below —10° C., followed by the supply thereto of 50 grams of polyacrylonitrile and thereafter was shaken at room temperature whereby a composite solution was obtained.

Similar results were obtained with 350 grams of p-chlorophenol in place of said trichloroacetic acid and/or with 50 grams of an acrylonitrile copolymer in place of said polyacrylonitrile.

EXAMPLE 16

1,000 milliliters of liquid sulfur dioxide cooled below —10° C. was introduced into a reactor, followed by the addition of 60 grams of polyethylene terephthalate and 360 grams of trichloroacetic acid. The reactor was held air-tight to maintain the sulfur dioxide in liquid state, and thereafter was shaken at room temperature thereby dissolving the polymer in the liquid sulfur dioxide. The reactor was again cooled below —10° C., followed by the supply thereto of 30 grams of polyacrylonitrile and 360 grams of ammonium thiocyanate and thereafter was shaken at room temperature whereby a reddish brown viscous composite solution was obtained.

EXAMPLE 17

1,000 milliliters of liquid sulfur dioxide cooled below —10° C. was introduced into a reactor, followed by the addition of 40 grams of polyethylene terephthalate and 500 grams of phenol or 200 grams of resorcinol. The reactor was held air-tight to maintain the sulfur dioxide in liquid state and thereafter, was shaken at room temperature thereby to dissolve the polymer in the liquid sulfur dioxide. The reactor was again cooled below —10° C., followed by the supply thereto of 50 grams of acrylonitrile-vinyl acetate copolymer having an acrylonitrile content of 89.5% and then was shaken at room temperature whereby a composite solution was obtained.

EXAMPLE 18

1,000 milliliters of liquid sulfur dioxide cooled below —10° C. was introduced into a reactor, followed by the addition of 30 grams of polyethylene terephthalate and 500 grams of phenol. The reactor was held air-tight to maintain the sulfur dioxide in liquid state, and thereafter was shaken at room temperature thereby to dissolve the polymer in the liquid sulfur dioxide. The reactor was again cooled below —10° C., followed by the supply thereto of 30 grams of polycaprolactam and then was shaken at room temperature whereby a composite solution containing polyamide and polyester was obtained.

EXAMPLE 19

500 milliliters of a first liquid sulfur dioxide solutions containing 30 grams of polyethylene terephthalate and 250 grams of phenol prepared in a manner similar to Example 11 was mixed with 500 milliliters of a second liquid sulfur dioxide solution containing 120 grams of polycaprolactam and 250 grams of ammonium thiocyanate and was stirred at room temperature whereby a homogeneous, reddish brown, viscous solution was obtained.

EXAMPLE 20

1,000 milliliters of liquid sulfur dioxide cooled below —10° C. was introduced into a reactor, followed by the addition of 10 grams of polycaprolactam and 200 grams of tetramethylammonium chloride. The reactor was held air-tight to maintain the sulfur dioxide in liquid state, and thereafter was shaken at room temperature thereby to dissolve the polymer in the liquid sulfur dioxide. The reactor was again cooled below —10° C., followed by the supply thereto of 10 grams of polyvinyl alcohol and 40 grams of diethylamine and then was shaken at 50° C. whereby a composite solution was obtained.

Experiments have shown that there may be obtained a variety of composite solutions by admixing the individual polymer solution prepared according to Examples 1 through 4, 11, 15, 16 and 18 through 20 with suitable amounts of polymethacrylate, polyvinyl acetate or polystyrene.

It will be understood that it is intended to cover all changes and modifications of the examples of the invention herewith chosen for the purpose of illustration which do not constitute departures from the spirit and scope of the invention.

What we claim is:

1. Process for preparing homogeneous polymer solution which comprises dissolving in liquid sulfur dioxide at least one acrylonitrile polymer selected from the group consisting of polyacrylonitrile, acrylonitrile-vinyl acetate copolymers, acrylonitrile-methacrylate copolymers and acrylonitrile-styrene copolymers in the presence of at least one solubilizing agent selected from the group consisting of inorganic salts which are easily soluble and highly ionizable in liquid sulfur dioxide, halogenoaliphatic acids, phenols, salts of lower aliphatic amines and salts of quaternary ammonium compounds.

2. Process as set forth in claim 1, wherein said solubilizing agent is selected from the group consisting of potassium iodide and ammonium thiocyanate.

3. Process as set forth in claim 1, wherein said solubilizing agent is selected from the group consisting of monochloroacetic acid, dichloroacetic acid and trichloroacetic acid.

4. Process as set forth in claim 1, wherein said solubilizing agent is selected from the group consisting of phenol, cresol, resorcinol and α-naphthol.

5. Process as set forth in claim 1, wherein said solubilizing agent is selected from the group consisting of triethylamine hydrochloride and β-chlorotriethylamine hydrochloride.

6. Process as set forth in claim 1, wherein said solubilizing agent is tetramethylammonium chloride.

7. Process for preparing homogeneous polymer solution which comprises dissolving in liquid sulfur dioxide cellulose and at least one acrylonitrile polymer selected from the group consisting of polyacrylonitrile, acrylonitrile-vinyl acetate copolymers, acrylonitrile-methacrylate copolymers and acrylonitrile-styrene copolymers in the presence of a first solubilizing agent selected from the group consisting of lower aliphatic secondary and tertiary amines, pyridine, and piperidine, and of a second solubilizing agent selected from the group consisting of salts of lower aliphatic amines and salts of quaternary ammonium compounds.

8. Process as set forth in claim 7, wherein said second solubilizing agent is selected from the group consisting of triethylamine hydrochloride and β-chlorotriethylamine hydrochloride.

9. Process as set forth in claim 7, wherein said second solubilizing agent is tetramethylammonium chloride.

10. Process for preparing homogeneous polymer solution which comprises dissolving in liquid sulfur dioxide cellulose and at least one acrylonitrile copolymer having not more than 85% of acrylonitrile content and being selected from the group consisting of acrylonitrile-vinyl acetate copolymers, acrylonitrile-methacrylate copolymers and acrylonitrile-styrene copolymer in the presence of at least one solubilizing agent selected from the group consisting of lower aliphatic secondary and tertiary amines, pyridine, and piperidine.

11. Process for preparing homogeneous polymer solution which comprises dissolving in liquid sulfur dioxide at least one acrylonitrile polymer selected from the group consisting of polyacrylonitrile, acrylonitrile-vinyl acetate copolymers, acrylonitrile-methacrylate copolymers and acrylonitrile-styrene copolymers, and at least one other polymer selected from the group consisting of polyvinyl acetate, polystyrene, polymethyl methacrylate, in the presence of at least one solubilizing agent selected from the group consisting of inorganic salts which are easily soluble and highly ionizable in liquid sulfur dioxide, halogeno-aliphatic acids, phenols, salts of lower aliphatic amines and salts of quaternary ammonium compounds.

12. Process for preparing homogeneous polymer solution which comprises dissolving in liquid sulfur dioxide cellulose, at least one acrylonitrile polymer selected from the group consisting of polyacrylonitrile, acrylonitrile-vinyl acetate copolymers, acrylonitrile-methacrylate copolymers and acrylonitrile-styrene copolymers and at least one other polymer selected from the group consisting of polyvinyl acetate, polystyrene, polymethyl methacrylate, in the presence of a first solubilizing agent selected from the group consisting of lower aliphatic secondary and tertiary amines, pyridine, piperidine, and of a second solubilizing agent selected from the group consisting of salts of lower aliphatic amines and salts of quaternary ammonium compounds.

References Cited

UNITED STATES PATENTS 2,404,728   7/1946   Finzel _____ 106—203

WILLIAM H. SHORT, *Primary Examiner.*

E. NIELSEN, *Assistant Examiner.*